United States Patent [19]

Morita et al.

[11] Patent Number: 4,756,436
[45] Date of Patent: Jul. 12, 1988

[54] OXYGEN SCAVENGER CONTAINER USED FOR CAP

[75] Inventors: Yoshikazu Morita; Toshio Komatsu; Yoshiaki Inoue, all of Tokyo, Japan

[73] Assignee: Mitsubishi Gas Chemical Company, Inc., Tokyo, Japan

[21] Appl. No.: 122,688

[22] Filed: Nov. 19, 1987

[30] Foreign Application Priority Data

Nov. 28, 1986 [JP] Japan ............................ 61-183507[U]

[51] Int. Cl.$^4$ ............................................. B65D 85/72
[52] U.S. Cl. ..................................... 215/228; 426/124
[58] Field of Search ................ 215/228; 426/118, 124; 206/0.7

[56] References Cited

U.S. PATENT DOCUMENTS

| 2,758,932 | 8/1956 | Scott | 99/171 |
| 4,287,995 | 9/1981 | Moriya | 215/228 |
| 4,421,235 | 12/1983 | Moriya | 206/524 |
| 4,667,814 | 5/1987 | Wakamatsu et al. | 206/0.7 |

FOREIGN PATENT DOCUMENTS

080260/80  6/1980  Japan .
080261/80  6/1980  Japan .
084253/80  6/1980  Japan .
161858/80  11/1980  Japan .

Primary Examiner—Donald F. Norton
Attorney, Agent, or Firm—Leydig, Voit & Mayer

[57] ABSTRACT

An oxygen scavenger container installed in a cap used for a liquid substance-containing vessel having an inner structure composed of an upper vacant compartment including a wall portion having at least one opening providing communication between the upper vacant compartment and the exterior of the scavenger container, a lower container compartment which contains the oxygen scavenger, and partition means provided to separate the upper compartment from the at least one opening and the lower container compartment, said partition means comprising single or plural sheets of gas permeable liquid-proof material to provide a double barrier between the oxygen scavenger and a liquid substance.

6 Claims, 4 Drawing Sheets

OXYGEN SCAVENGER CONTAINER USED FOR CAP

FIELD OF INVENTION AND THE RELATED ART

1. Field of the Invention

The present invention relates to a container used for a cap containing an oxygen scavenger, particularly an oxygen scavenger container, which is installed inside a vessel containing liquid substance, and a cap, in which said container is installed. Here, the liquid substance means the usual liquids including semi-liquids, e.g. liquid goods, alcoholic drinks, soy-sauce, nourishing drinks or photographic developing solution. They contain nourishing substances for microorganisms or reductive substances, and putrefaction or deterioration by microorganisms and discoloration or malfunction by oxidation of reductive substances are sometimes induced in the presence of oxygen in the air. These phenomena can be prevented by removing oxygen inside the system. The present invention is concerned with such technique.

2. Related Art

Heretofore, the following methods have been known to preserve various liquid substances including food.

For example, in the case of wines, sterilization of microorganism has been effected by elevating temperature up to 70°-80° C. before filling wine in a vessel. However, this method has the disadvantage of spoiling the taste of wine.

To preserve foodstuffs or other liquids, replacement of air in sealed vessels by nitrogen is conducted. A disadvantage of this method is that oxygen can not be completely eliminated because of the permeation through the wall of vessel. Also, reduction of the oxygen concentration under 1% is difficult from the perspective of economics and, therefore, the preservation effect by this method is practically limited.

Another method involves adding a preservative agent to a liquid, but the agent spoils the taste of the liquid and the question of safety and the effect of the human body is under debate now.

As the most effective preservation method of food, the application of oxygen scavenger to sealed vessels containing food has spread recently and an example of an oxygen scavenger installed in a cap of bottle is indicated.

Examples are shown in Japan Utility Model Application Laid-Open Nos. 161858/'80 and 38056/'81, that a gas permeable water-proof bag or molded sealing container including an oxygen scavenger is installed in a chamber annexed to a cap or fitted with a holder attached to a cap.

Since these caps have oxygen scavenger containers which are partially composed of porous sheets which are water proofing at normal pressure and have gas permeable properties, they are water resistant compared with the paper bag packaging of oxygen scavengers, but if the oxygen scavenger forms hard lumps by oxidation under humid circumstances, it adheres to the gas permeable sheets and a liquid component formed by the oxidation and moisture adsorption may ooze through the sheet.

Particularly, when the whole liquid vessel tilts or vibrates, the oxygen scavenger container moves around in a compartment annexed to the cap, occasionally resulting in a tilted or upset state by collision with the compartment walls.

In such a case, the sheet is damaged or the oxygen scavenger adheres to the sheet inducing the foregoing oozing phenomenon.

Also, because these caps have perforations beneath the compartment, the swinging liquid surface in a vibrating vessel readily enters the oxygen scavenger compartment and foregoing ooze causes contamination of the liquid.

Another type of cap, which has a compartment clamped by a holder, has disadvantages of the compartment which is easily wetted by spilled liquid and deformed and damaged causing deterioration of the water resistance of the material from which the compartment is formed.

Moreover, these caps have such a complex structure, being composed of more than two parts inside, that their difficult workability is another drawback.

The capped vessel includes an oxygen scavenger container inside, so a narrow-mouthed bottle is inconvenient to accommodate a sufficient amount of oxygen scavenger.

OBJECT AND SUMMARY OF THE INVENTION

The present inventors examined structures of caps and oxygen scavenger containers installed therein, with objectives to improve the drawbacks of these conventional caps containing oxygen scavenger, particularly the oxygen scavenger container, in order to maintain the quality of liquid substances by using a liquid or water-proof and gas permeable sheet and to prevent the ooze from contaminating the liquid substance, and have achieved the present invention.

One of the objects of this invention is to provide an improved oxygen scavenger container for a cap, wherein oxygen is eliminated from a sealed vessel containing a liquid substance intended for preservation.

Another object of this invention is to provide an oxygen scavenger container for a cap, wherein the oxygen scavenger container is partitioned by using a gas permeable sheet for efficient oxygen absorption.

Another object of this invention is to provide an oxygen scavenger container for a cap, wherein the contained oxygen scavenger is duplicately isolated by partitioning using a gas permeable liquid-proof sheet for prevention of a liquid substance from being contaminated by eliminating moistening and oozing of the oxygen scavenger.

A further object of this invention is to provide various caps, such as press fit caps, crown caps or screw caps, used for liquid vessels equipped with compact oxygen scavenger containers having the foregoing high performance.

The present invention relates to an oxygen scavenger container, which is installed inside the cap used for a vessel adapted to contain a liquid substance, wherein the container has a cup form provided with an upper vacant compartment, which has perforations from outside of said body, and a lower compartment, which contains the oxygen scavenger. After the oxygen scavenger is contained, the range of perforation through the upper vacant compartment to the lower compartment is partitioned at two places by using gas permeable liquid-proof sheets, to isolalate duplicately the oxygen scavenger from liquid substance.

Consequently, an efficient deoxidation, together with prevention of the liquid from contamination, is achieved without getting wet and causing oozing of the oxygen scavenger.

DETAILED DESCRIPTION OF THE PREFERRED EMBODIMENTS

The oxygen scavenger container of this invention is, for example as shown in a drawing, available to conventional press fit caps or screw caps for sake bottles keeping their original functions and shapes.

This oxygen scavenger container from the functional point of view is available for use in a cap, as far as its external form permits it to be installed inside the cap, preferably as a cup, flanged cylinder, or flanged cup types. The interior of the container comprises an integrated structure of an upper vacant compartment with a lower container compartment. This container is usually made by injection molding of polyolefins such as polyethylene and polypropylene, and to other plastic materials such as polyester, polyvinyl chloride and polystyrene.

In the walls defining the upper vacant compartment, openings perforated (hereinafter called a perforated opening) from outside the body exist. The cross-sectional form of perforated opening is not particularly restricted, but more than one, preferably 6–8 number of circular, square or rectangular forms of perforated openings with minimum diameter over 0.2 mm, preferably over 0.5 mm, and maximum diameter under 10 mm, preferably under 5 mm, are provided.

The range of perforation through the upper vacant compartment to the lower compartment is partitioned at two places with gas permeable liquid-proof sheets.

The oxygen permeability of said sheets is over 1000 ml/m² D·atm, preferably 10,000 ml/m² D·atm. These sheets are at least water-proof at normal pressure, preferably water pressure resistant, and produced by processing, such as cold orientating of synthetic resin films, orientating, of foreign substance-containing films, orientating of foreign substance-containing films after said foreign substance extraction, hot pressing of laminated and interlaced nonwoven fabrics, electron irradiation of films, hot pressing of wet-formed films, embossing of films, etc., which are made of synthetic resin such as polyethylene, polypropylene, ethylenevinyl acetate copolymer (EVA), polyethylene terephthalate, polyvinyl chloride, etc. As practical examples of commercial products, Celgard (Celanese, U.S.A.), NF sheet (Tokuyama Soda, Japan), Tyvek (Du Pont, U.S.A.), ALT (Awa Paper Mfg., Japan), Nitto Flon (Nitto Electric Industrial, Japan), Gore-Tex (Gore & Co., U.S.A.) etc. are indicated.

In order to improve water resistance and oil resistance of these sheets, the surface may be coated and/or impregnated with suitable materials, examples of preferred materials including silicone resin, silicone acrylic resin, polyfluorocarbons etc. are preferable.

Figure 1:
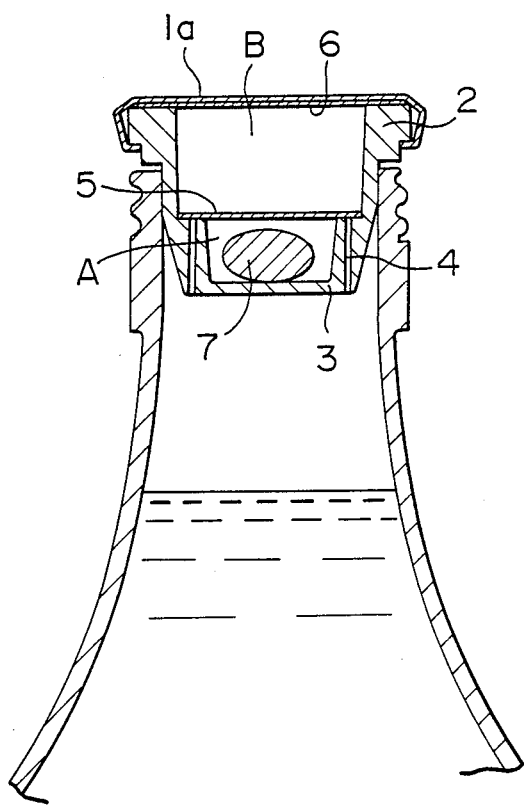
FIG. 1 indicates a preferred embodiment of this invention and also a cross-sectional diagram illustrating a press fit cap applicable to a sake bottle.
Figure 2:
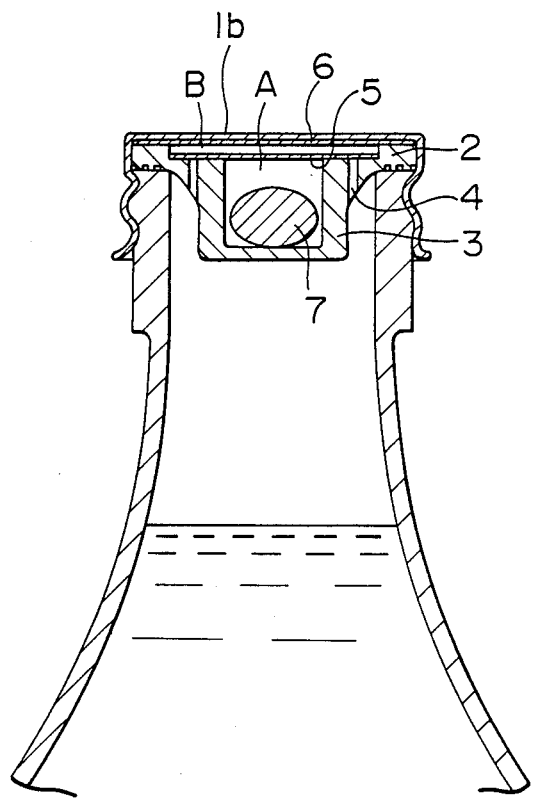
FIG. 2 indicates another preferred embodiment of this invention and also a cross-sectional diagram applied to a screw cap.
Figure 3:
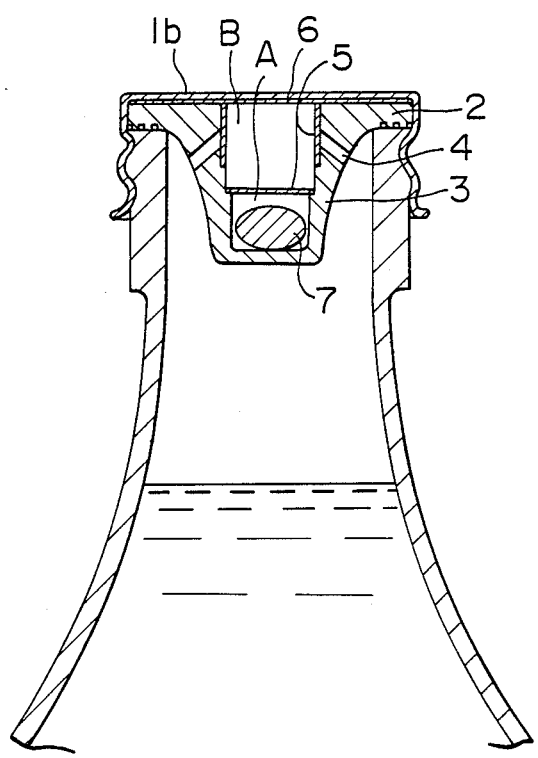
FIGS. 3 and 4 indicate other preferred embodiments of this invention and cross-sectional diagrams used for screw caps.

Various partition positions using these sheets are conceivable, but in general two places, i.e., at the boundary surface between the perforation and the upper vacant compartment and at the boundary surface between the upper vacant compartment and the lower container compartment are determined selectively using two partition sheets (FIG. 3). However, by positioning the boundary surface between the perforation and the upper vacant compartment in the same plane as between the upper vacant compartment and the lower container compartment, the partition can be realized by using one sheet (FIGS. 1 and 2).

Another partition arrangement includes, without forming a partition at the boundary surface of the perforation and the upper vacant compartment, two places of partition are formed using the sheet in parallel spaced relationship to each other between the perforated opening and the lower container compartment.

According to the foregoing constitution, as one embodiment, oxygen inside the vessel containing a liquid substance passes through these perforations to the upper vacant compartment via the partition sheet, and proceeds to the lower container compartment via the partition sheet between the upper vacant compartment and lower container compartment.

As another embodiment, oxygen can pass through these perforations to the upper vacant compartment and proceed to the lower container compartment via two partition sheets between the upper vacant compartment and the lower container compartment. Oxygen is absorbed by the oxygen scavenger in the container compartment.

The upper vacant compartment has a structure which is sealed and isolated from the exterior of the container by means of walls of molded body and gas barrier sheets at the upper part, excluding the lower part where the partition sheet between the lower container compartment and perforations exist.

The oxygen permeability of the gas barrier sheet, which is used at the upper part in this invention, is desirable to be under 100 ml/m² D·atm, particularly preferable under 50 ml/m² D·atm. For example, nylon, polyester, polypropylene, polyethylene and polyvinyl chloride sheets or films and these low foamed substances, these composite film-based materials, polyvinylidene chloride coated and/or Al foil and Al deposit sheets or films thereof are used. Furthermore, in order to adhere these sheets to the upper vacant compartment, the lamination of these sheets with other sheets such as paper for the purpose of preventing these sheets or films from curling is preferable.

The lower container compartment of this invention is composed of a gas and liquid-proof molded body, except for the partition sheet between it and the upper vacant compartment, containing an oxygen scavenger inside.

There is such a space allowance provided between the oxygen scavenger and the sheet that the oxygen scavenger, which is only in contact with the molded body and not in contact with the gas permeable sheet, readily contacts air in the upper space of the liquid containing vessel through the double gas permeable sheets and perforations.

The oxygen scavenger used in this invention comprises powder of metals including iron, ferrous salts such as ferrous sulfate and ferrous chloride, reducing sulfur compounds such as dithionite, ascorbic acid and/or their salts, erythorbic acid and/or their salts, reducing organic compounds such as catechol and hydroquinone. Particularly preferable are iron powder, ascorbic acid and/or their salts, erythorbic acid and/or their salts, as the chief agent.

The oxygen scavenger used in this invention can be any form of powder, granule, sphere or tablet. Particularly, a tablet type oxygen scavenger is preferable from the standpoint of easy processability of the cap of this invention.

The wall of the oxygen container of this invention, which is usually in contact with the contents or oxygen scavenger, is composed of non-permeable plastic-molded material and, furthermore, there is such a space allowance between the oxygen scavenger and the gas permeable sheet that the oxygen scavenger is not kept in contact with the sheet, and the upper vacant compartment separated by the sheet is in contact with its liquid substance at the lower part only through the perforation which is partitioned by said sheet. Accordingly, even if a penetrative liquid is formed when the oxygen scavenger absorbs oxygen and/or moisture therein, such a liquid can not penetrate into the liquid substance.

That results in effective deoxidation of the liquid substance with no contamination, and effects preservation of good quality.

Moreover, since the oxygen scavenger container has an integrated structure, its molding is comparatively simple and its space can be efficiently used; consequently, volume of the oxygen scavenger is appropriately adjusted depending on the air volume in the vessel.

The easy installation of the oxygen scavenger container in a cap and stable and useful service-ability of the installed cap are observed, and no problem occurs compared with the case when conventional noninstalled caps are used.

The practical description of this invention in accordance with preferred embodiment (drawings and examples) is as follows:

EXAMPLE (FIG. 1)

FIG. 1 shows an example of the oxygen scavenger container of this invention. A terrace is formed at the middle of cylindrical hole made inside the cup-like body, where an upper vacant compartment B and a lower container compartment A are separated, and perforated openings surrounding the lower container compartment A are equipped upward from the lower outside (in the bottle).

In the lower container compartment A, an oxygen scavenger 7 is contained, and gas permeable liquid-proof sheet 5 forms a partition separating the upper vacant compartment B from the lower container compartment A, and also separating the vacant compartment B from perforations 4 at foregoing terrace.

Moreover, the upper perimeter 2 of the cup-like body has a fringe, which forms a terrace to mount a metallic lid 1-a, and the lower perimeter 3 is tapered downward.

In order to keep airtightness, this container is mounted to the metallic lid 1-a with a gas barrier sheet 6 therebetween, as shown in the figure, and a complete press fit cap for a sake bottle is accomplished together with the upper vacant compartment B.

According to foregoing constitution, air can not enter inside the bottle as a matter of course, because of the airtightness kept by using the gas barrier sheet 6 between the lid and the oxygen scavenger container, so that oxygen inside the bottle is eliminated by the oxygen scavenger. Even if the bottle was upset, the liquid substance inside the bottle is hindered from entering the upper vacant compartment by the gas permeable liquid-proof sheet 5 and, moreover, no problem of wet oxygen scavenger occurs at the duplicately isolated lower container compartment. The material from which the oxygen scavenger container in this example is made is polyethylene, and as the gas permeable liquid-proof sheet 5 and the gas barrier film 6, a processed product of high density polyethylene fibers (trade name: Tyvek, Du Pont, U.S.A.) and a nylon-polyethylene laminated sheet coated with polyvinylidene chloride are used, respectively.

A tablet type oxygen scavenger using iron as the active agent is used.

EXAMPLE 2

(FIG. 2)

FIG. 2 shows the same constitution as Example 1 (FIG. 1), excluding a relatively reduced space of the upper vacant compartment B and a lowered height as a whole in order to fit within the screw cap 1-b. The reason for reducing the space of the upper vacant compartment B is that lowering the whole height is better for mounting it on to the screw cap and no liquid substance infiltrates the upper vacant compartment according to the constitution of this invention.

The materials and function of the container are not particularly different from those of Example 1 (FIG. 1).

EXAMPLE 3

(FIG. 3)

FIG. 3 shows a fitting within the screw cap 1-b, similar to FIG. 2. Particularly, by making perforations through the upper side walls of the body, perforated openings move upward and, therefore, two partition sheets are necessary at the boundary surfaces between perforations and the upper vacant compartment and between the upper vacant compartment and lower container compartment. Materials and function of the container are not particularly different from those of Example 1 (FIG. 1) and Example 2 (FIG. 2).

EXAMPLE 4

(FIG. 4)

Figure 4:
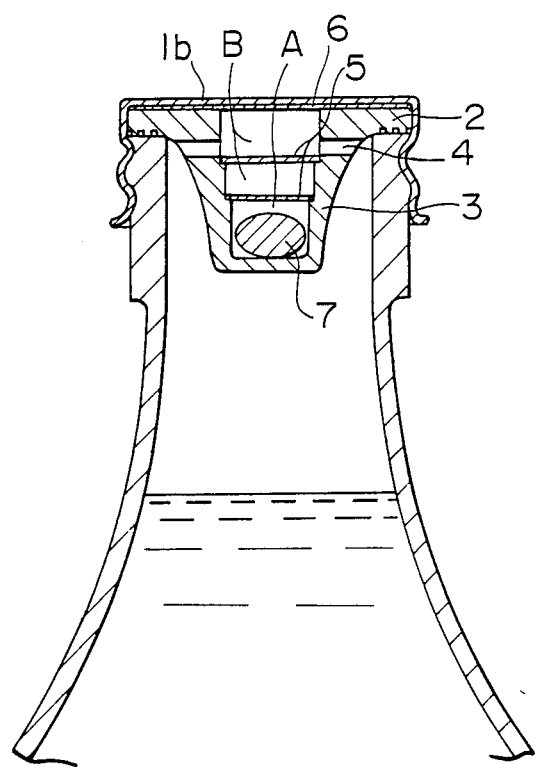

FIG. 4 shows a fitting within the screw cap 1-b, similar to FIGS. 2 and 3. Particularly, making perforations through the upper sidewalls of the body, similar to FIG. 3, two sheets are installed in parallel at two places with a distance, from the perforated openings inside the upper vacant compartment downward to the lower container compartment.

Materials and function of the container are not particularly different from those of Examples 1–3 (FIGS. 1–3).

EXAMPLE 5

(Practical example)

A container made of polyethylene shown in FIG. 2 was fitted within a screw cap which was used for the sealing of a 300 ml-sake bottle. It was left to stand at 25° C. After 6 months, gas inside the bottle was collected as a sample by using a gas sampler through the cap part, and analysis of the oxygen concentration by gas chromatography, together with a quality test of sake in the opened bottle, was carried out. The results are shown in Table 1.

A comparative example, which indicates results of a test conducted in the same way as foregoing practical example, except using a screw cap in which no oxygen scavenger is mounted, is shown together with the practical example, in Table 1.

TABLE 1

|  | Practical example | Comparative example |
| --- | --- | --- |
| Oxygen concentration of gas inside bottle: | 0.01% | 17.6% |
| Optical density of sake ($OD_{20}^{430}$): | 0.012 | 0.041 |
| Sensor evaluation odor: | 4 | 2 |
| (5-rating *1) taste: | 4 | 2 |

(*1) 5-rating: 5: excellent, 4: good, 3: fair, 2: bad, 1: worst

What is claimed is:

1. An oxygen scavenger container installed in a cap used for a liquid substance-containing vessel having an inner structure composed of an upper vacant compartment including a wall portion having at least one opening providing communication between the upper vacant compartment and the exterior of the scavenger container, a lower container compartment which contains the oxygen scavenger, and partition means provided to separate said upper compartment from said at least one opening and said lower container compartment, said partition means comprising single or plural sheets of gas permeable liquid-proof material to provide a double barrier between the oxygen scavenger and a liquid substance.

2. The oxygen scavenger container installed in a cap according to claim 1 wherein said container is an integrated molding of plastic.

3. The oxygen scavenger container installed in a cap according to claim 1 wherein said container has a plurality of openings.

4. The oxygen scavenger container installed in a cap according to claim 1 wherein one of said gas permeable liquid-proof sheets is used as a partition between said at least one opening and said upper vacant compartment and another sheet is used as as a partition between said upper vacant compartment and said lower container compartment, respectively.

5. The oxygen scavenger container installed in a cap according to claim 1 wherein said partition means comprise two sheets arranged in parallel and spaced relationship to one another, said partition means located inside the upper vacant compartment between said at least one opening and the lower container compartment.

6. A cap used for a liquid substance-containing vessel inside which an oxygen scavenger container is installed, said oxygen scavenger container having an inner structure composed of an upper vacant compartment including a wall portion having at least one opening providing communication between said upper vacant compartment and the exterior of the oxygen scavenger container, a lower container compartment which contains the oxygen scavenger, and partition means provided to separate said upper vacant compartment from said at least one opening and said lower container compartment, said partition means comprising at least one gas permeable liquid-proof sheet to provide a barrier between the oxygen scavenger and a liquid substance.

* * * * *